United States Patent [19]

McCoy

[11] 4,073,259
[45] Feb. 14, 1978

[54] AUTOMOTIVE THEFT SIGNALLING DEVICE

[76] Inventor: Howard J. McCoy, 1538 E. 9th St., Stockton, Calif. 95206

[21] Appl. No.: 757,741

[22] Filed: Jan. 7, 1977

[51] Int. Cl.² .............................................. B60R 25/10
[52] U.S. Cl. .................................... 116/33; 180/114; 280/766; 340/63
[58] Field of Search .................. 116/33, 60, 56, 35 R, 116/28 R, 46, 67 R, 75, 99; 180/114; 340/63, 65

[56] References Cited

U.S. PATENT DOCUMENTS

| 562,948 | 6/1896 | Brown | 116/60 |
|---|---|---|---|
| 1,689,909 | 10/1928 | Breidt | 116/33 |
| 1,747,194 | 2/1930 | Thomas | 340/65 |
| 2,412,035 | 12/1946 | Dornak | 116/28 R |
| 3,471,168 | 10/1969 | Steinberg et al. | 280/766 X |

*Primary Examiner*—Daniel M. Yasich
*Attorney, Agent, or Firm*—Roger B. Webster

[57] ABSTRACT

A device, mounted on an automobile, operative—upon being pre-set to a working position—to produce an exteriorly audible signal if the automobile is subsequently operated without authority, as for example when stolen. The device comprises, essentially, a frame-mounted post unit having a wheel on its lower end, the post unit being vertically adjustable from within the automobile between a normally raised, out-of-use position wherein the wheel is clear of the road, and a lowered, working position wherein the wheel is in contact with and rotated by the road upon travel of the automobile, and a signal unit associated with the wheel and functioning upon rotation thereof to produce such audible signal, apprising others—such as law enforcement officers—that the automobile is being operated without authority.

10 Claims, 8 Drawing Figures

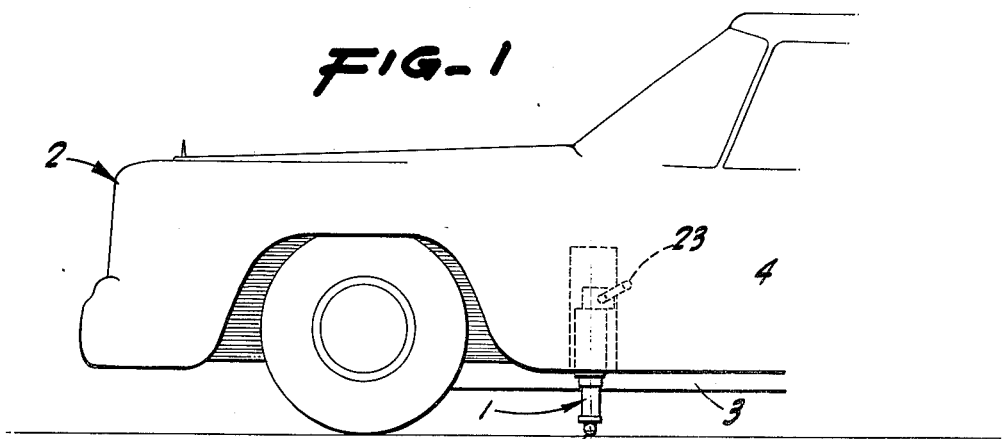
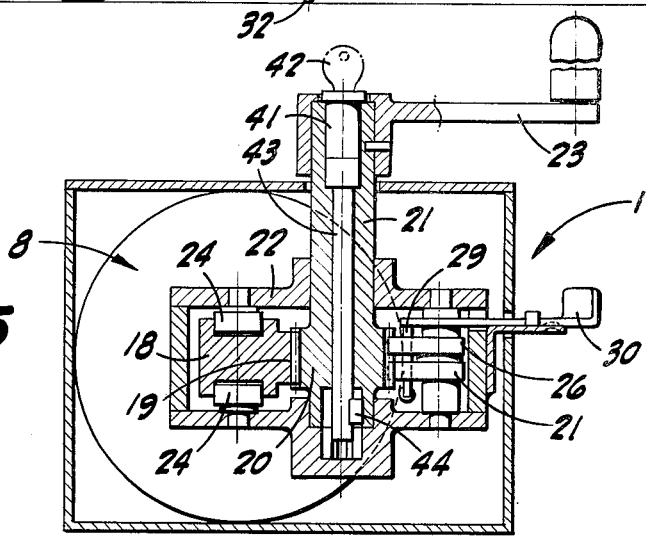
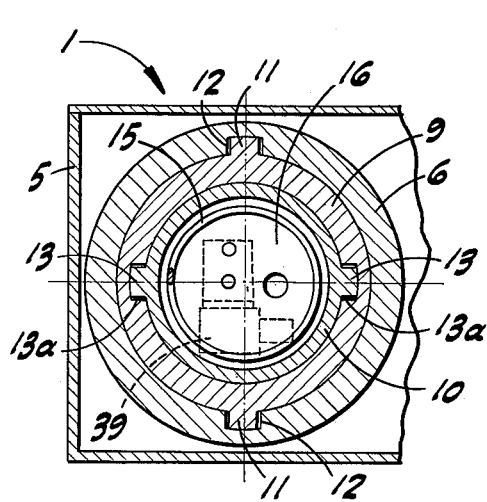
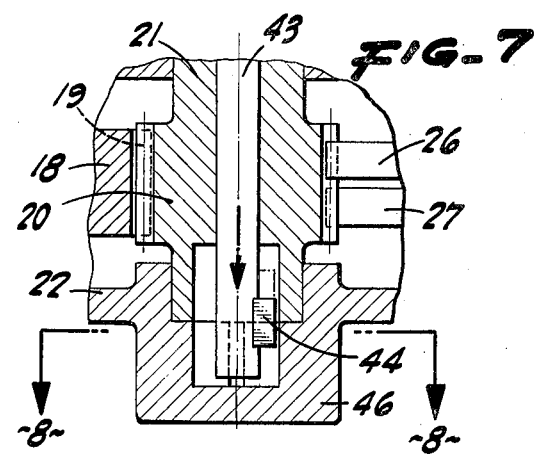

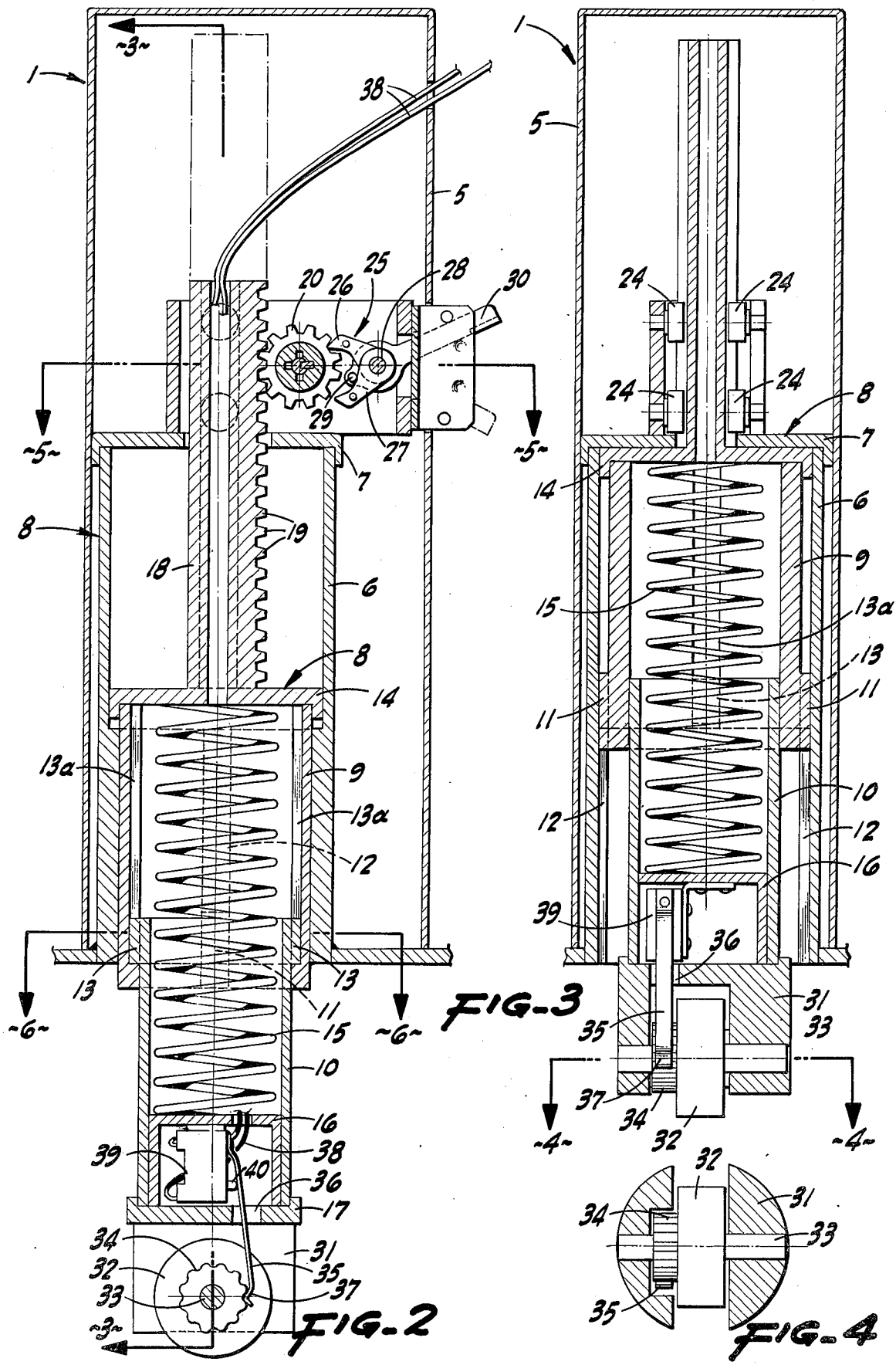

AUTOMOTIVE THEFT SIGNALLING DEVICE

BACKGROUND OF THE INVENTION

1. Field of the Invention

The present invention relates in general to a theft signalling device for an automobile and, while numerous devices for the purpose have previously been developed by others, such devices have in many instances been unreliable, or unsatisfactory for other reasons. The present invention was conceived by me in a successful effort to bring forward an automotive theft signalling device which meets the requirements of utility, reliability, and practicality.

2. The Prior Art

U.S. Pat. Nos. 1,332,180; 1,349,467; 1,453,240; 2,494,039 and 2,810,361 represent the prior art to the extent known to applicant, and applicant has no knowledge of any prior art disclosing the particular structure of the herein-claimed automotive theft signalling device.

SUMMARY OF THE INVENTION

The present invention provides, as a major object, an automotive theft signalling device operative—upon being pre-set to a working position—to produce an exteriorly audible signal if the automobile is subsequently operated without authority, as for example when stolen.

The present invention provides, as another important object, an automotive theft signalling device, as above, which—in a preferred embodiment—comprises, essentially, a frame-mounted post unit having a wheel on its lower end, the post unit being vertically adjustable from within the automobile between a normally raised, out-of-use position wherein the wheel is clear of the road, and a lowered, working position wherein the wheel is in contact with and rotated by the road upon travel of the automobile, and a signal unit associated with the wheel and functioning upon rotation thereof to produce such audible signal apprising others—such as law enforcement officers—that the automobile is being operated without authority.

The present invention provides, as a further object, an automotive theft signalling device which is designed for ease and economy of manufacture, and convenience of installation.

The present invention provides, as a still further object, a practical, reliable, and durable automotive theft signalling device, and one which is exceedingly effective for the purpose for which it is designed.

BRIEF DESCRIPTION OF THE DRAWINGS

FIG. 1 is a diagrammatic view showing the placement of the theft signalling device on an automobile.

FIG. 2 is an enlarged side elevation, in section, of the device as extended downward to working position.

FIG. 3 is a sectional elevation taken substantially on line 3—3 of FIG. 2, but shows the device as retracted upward to non-working position.

FIG. 4 is a sectional plan view taken substantially on line 4—4 of FIG. 3; the view showing essentially the ground-engaging wheel and associated ratchet disc.

FIG. 5 is a sectional plan view taken substantially on line 5—5 of FIG. 2; the view showing essentially the rack and pinion assembly, together with the associated holding unit.

FIG. 6 is a sectional plan view taken substantially on line 6—6 of FIG. 2.

FIG. 7 is an enlarged, fragmentary, sectional plan view showing essentially the shiftable lock rod of the lock unit.

FIG. 8 is a fragmentary cross section on line 8—8 of FIG. 7.

DESCRIPTION OF THE PREFERRED EMBODIMENT

Referring now more particularly to the drawings and to the characters of reference marked thereon, the device, indicated generally at 1, is mounted on an automobile 2 in a position, fixed in connection with the automobile frame 3, immediately to the left of the driver's station but inwardly of the outer shell of the automobile body 4.

The device 1 comprises an upstanding, automobile-frame supported housing 5 which encloses a fixed cylinder 6 which opens downwardly either clear of or through the automobile frame 3; such fixed cylinder 6 terminating at its upper end, which is closed by a head 7, some distance below the upper end of the housing 5.

A vertically adjustable post unit, indicated generally at 8, is associated with the fixed cylinder 6 and includes a piston-like upper sleeve 9 adapted to be adjusted up and down in the fixed cylinder 6. The post unit further includes a telescopic lower sleeve 10 slidable within and projecting below said piston-like upper sleeve 9.

The piston-like upper sleeve 9 is limited in its downward travel in the fixed cylinder 6 by short splines 11 which run in limited depth, bottom-closed grooves 12 in the internal wall of fixed cylinder 6.

Similarly, downward motion in, or the extent of projection of the telescopic lower sleeve 10 from, the piston-like upper sleeve 9, is limited by splines 13 which run in bottom-closed grooves 13a in the internal wall of said sleeve 9.

The piston-like upper sleeve 9 includes a head 14, and a heavy-duty compression spring 15 is disposed within the assembly of sleeves 9 and 10; such spring bearing—at its upper end—against the head 14 of sleeve 9 and bearing—at its lower end—on an inverted cup 16 in the bottom of sleeve 10 and resting on the lower end head 17 of the latter. The spring 15 normally acts to hold the telescopic lower sleeve 10 in a position of maximum downward projection from sleeve 9. With this array, the lower sleeve 10 is upwardly, vertically yieldable. and—upon such yielding motion—telescopes into the sleeve 9.

In addition to the above assembly of sleeves 9 and 10, the post unit includes a vertical rack 18 fixed centrally on head 14 of sleeve 9, and thence extending upwardly freely through, and to a termination above, the head 7 of fixed cylinder 6.

Along one side thereof, the rack 18 includes a vertical row of rack teeth 19 which engage in mesh with a pinion 20 on a tubular cross shaft 21 journaled in a casing 22 fixed on the head 7.

The tubular cross shaft 21 extends laterally inwardly from the casing 22 and through the housing 5 to a termination exteriorly of the latter; the free end or terminal portion of such cross shaft 21 being fitted with a hand crank 23 accessible to the driver of the automobile.

From the foregoing, it will be apparent that—by rotating the hand crank 23 in one direction —the post unit 8 as a whole can be run downward to the limit of its travel (see FIG. 2), and thereafter—by rotation of the hand crank in the opposite direction—said post unit can be adjusted upwardly to the limit of travel in such latter direction (see FIG. 3).

Adjacent the pinion 20, and on the side thereof opposite the rack 18 (which rack is guided by rollers 24), the casing 22 supports a holding unit, indicated generally at 25; the purpose of such holding unit being to lock the rack 18 in the lowered, working position of the post unit 8 (see FIG. 2), or in the raised, non-working or out-of-use position of said post unit 8 (see FIG. 3). The holding unit 25 is here shown as embodying a spring-urged upper pawl 26, and a spring-urged lower pawl 27; such pawls being carried on a pivot shaft 28. Upon engagement of the upper pawl 26 with the rack teeth 19, the rack 18 is held against vertical travel. On the other hand, upon engagement of the lower pawl 27 with the rack teeth 19, the rack 18 is held against upward travel.

When it is desired that the upper pawl 26 function, the lower pawl 27 is shifted to a non-working position by a cross finger 29 on the inner end of a hand lever 30 journaled intermediate its ends on the pivot shaft 28. When the hand lever 30 is in an "up" position, the lower pawl 27 is shifted against its spring action to such non-working position. Similarly, when the hand lever 30 is moved to a "down" position, the upper pawl 26 is shifted against its spring action to a non-working position.

With the foregoing arrangement, it will be recognized that the vertically adjustable post unit 8 can be selectively releasably locked against upward or downward travel; i.e., travel of the post unit 8 in the fixed cylinder 6.

At the lower end of the telescopic sleeve 10, it is fitted with a fixed, generally spherical shroud 31 slotted for the reception of a wheel 32 carried on a cross shaft 33 journaled in the shroud 31. The diameter of the wheel 32 is such that it projects at the bottom out of the shroud 31 for road engagement in the manner hereinafter described.

Coaxially of the wheel 32, and likewise within the shroud 31, the cross shaft 33 is fitted with a peripherally notched circular member or ratchet disc 34. A heavy-duty but vibratory spring finger 35 is fixedly mounted within the confines of the inverted cup 16 and projects downwardly—in clearance relation—through a hole 36 in the lower end head 17 to a lower end termination at the periphery of the ratchet disc 34. Such spring finger 35 is formed at its lower end with a V-bend click or detent 37 which runs on the periphery of the ratchet disc 34.

When the driver desires to park the automobile with the theft signalling device in working position, the hand crank 23 is operated in a direction to thrust the vertically adjustable rack 18 and the piston-like upper sleeve 9 downwardly until the wheel 32 rests on the surface of the road, and the telescopic lower sleeve 10 is relatively pushed upwardly a distance to further load the spring 15. The rack 18 is then locked against upward travel by suitable manipulation of the holding unit 25.

Thereafter, if the automobile is operated without authority (as when stolen), the wheel 32—running on the surface of the road—rotates relatively fast (the spring 15 permitting the wheel to follow the road contour), and, in consequence, there is like rotation of the ratchet disc 34; the rotation of the latter, in cooperation with the vibratory spring finger 35, producing a signal which is heard exteriorly of the automobile, and which signal apprises others (such as law enforcement officers) that the automobile is being operated without authority.

In addition to the mechanical vibratory and sound-producing action of the spring finger 35, the automobile may also be provided with an electronic signal (not shown) intermittently operated through the medium of circuit wires 38 leading from a micro-switch 39 mounted in the inverted cup 16 and including a push button 40 recurringly depressed by operation of the vibratory spring finger 35.

In the illustrated embodiment, the switch 39 provides the mount for the upper end of the vibratory spring finger 35.

In order to assure that the theft signalling device (when in its lowered, working position) cannot be released by an unauthorized person who may gain entry into the automobile, the following safety feature is provided:

The outer or free end portion of the tubular cross shaft 21 is provided with a fixed-in-place cylindrical lock unit 41 which includes—in response to manipulation of a manually removable key 42—a laterally shiftable lock rod 43 which—at its inner end—includes a radial key 44 adapted to shift laterally from a non-locking position into one of several circumferentially spaced locking grooves or keyways 45 formed in a boss 46 on the casing 22 in the side opposite the hand crank 23. In the normal position of the lock rod 43, the key 44 is clear of the keyways 45. However, upon manipulation of the manual key 42, the lock rod 43 shifts to a position which introduces the radial key 44 into one of the grooves 45; this, then, effectively locking the hand crank 23 against rotation. Of course, the driver—as he leaves the automobile, removes the manual key 42.

The lower sleeve 10 is exteriorly finished with a bright iridescent color, as is the shroud 31, so that when the theft signalling device is in use with the wheel in road engagement, such colored parts are more readily visible beneath the automobile. This further indicates to people viewing the automobile that it is being operated without authority.

From the foregoing description, it will be readily seen that there has been produced such a theft signalling device as substantially fulfills the objects of the invention as set forth herein.

While this specification sets forth in detail the present and preferred construction of the theft signalling device, still in practice such deviations from such detail may be resorted to as do not form a departure from the spirit of the invention as defined by the appended claims.

I claim:

1. An automobile theft signalling device comprising a post unit, means adapted to mount the post unit on an automobile within the confines of the body thereof but with the lower end of the post unit exposed in the direction of the road, said post unit being vertically adjustable between a normally raised out-of-use position clear of the road and a lowered, working position with the lower end of the post unit adjacent the road, a wheel journaled on the lower end of the post unit and running in engagement with the road in said working position of the post unit, and means coacting responsive to rotation of the wheel operative to produce a sound which is heard from exteriorly of the automobile, and means manually actuated from within the automobile to vertically adjust the post unit to dispose the same in said out-of-use position, or working position, selectively.

2. A device, as in claim 1, in which said sound-producing means comprises a ratchet disc connected to and rotatable by the wheel, and a vibratory spring finger fixed at one end on the post unit and having a free end adjacent the ratchet disc; said finger including a free-end click which rides the periphery of the ratchet disc.

3. A device, as in claim 1, in which the post unit includes a guided, upstanding, toothed rack, a pinion in mesh with the rack, and hand means within the automobile arranged to rotate the pinion whereby to raise or lower the rack so as to dispose the post unit in its out-of-use position or working position, selectively.

4. A device, as in claim 3, including releasable means—accessible means—from within the automobile—to lock the rack in said raised position, or lowered position, selectively.

5. A device, as in claim 3, in which said hand means is a crank accessible from the driver's station of the automobile.

6. A device, as in claim 5, in which said hand means includes a key lock adapted to secure the hand crank against rotation; such lock having a removable hand key.

7. A device, as in claim 1, in which the post unit includes an upper section, a lower section, the lower section being arranged in guided, relatively vertically slidable relation to the upper section, and spring means between the sections yieldably urging the lower section downwardly whereby the wheel is maintained in road engagement while traversing undulations therein.

8. A device, as in claim 7, in which the upper and lower sections are sleeves, the lower sleeve being slidably telescoped into the upper sleeve, the spring being encompassed by the sleeves and engaged between a top head on the upper sleeve and a bottom head on the lower sleeve.

9. A device, as in claim 8, in which the post unit mounting means includes a fixed cylinder; the upper sleeve being piston-like and reciprocably disposed in said fixed cylinder.

10. A device, as in claim 1, in which the post unit mounting means includes a fixed cylinder, and the post unit comprises a piston-like upper sleeve reciprocable in the fixed cylinder, a guided toothed rack upstanding from the top of the upper sleeve, a pinion in mesh with the rack, and hand means within the automobile arranged to rotate the pinion whereby to raise or lower the rack so as to dispose the post unit in its out-of-use position, or in-use position, selectively; there being releasable means—accessible only from within the automobile—to lock the rack both in a raised position and a lowered position; and the post unit further including a lower sleeve slidably telescoped into the upper sleeve, and spring means between the sleeves yieldably urging the lower sleeve downwardly whereby the wheel is maintained in road engagement.

* * * * *